United States Patent

Fennel et al.

[11] Patent Number: 5,476,311
[45] Date of Patent: Dec. 19, 1995

[54] CIRCUIT CONFIGURATION FOR DETECTING WHEEL SENSOR MALFUNCTIONS

[75] Inventors: Helmut Fennel, Bad Soden; Ivica Batistic, Frankfurt am Main; Michael Latarnik, Friedrichsdorf, all of Germany

[73] Assignee: ITT Automotive Europe GmbH, Germany

[21] Appl. No.: 178,300

[22] PCT Filed: Jun. 20, 1992

[86] PCT No.: PCT/EP92/01392

§ 371 Date: Jan. 5, 1994

§ 102(e) Date: Jan. 5, 1994

[87] PCT Pub. No.: WO93/01074

PCT Pub. Date: Jan. 21, 1993

[30] Foreign Application Priority Data

Jul. 6, 1991 [DE] Germany .................... 41 22 484.1

[51] Int. Cl.⁶ ........................................................ B60T 8/88
[52] U.S. Cl. ...................................... 303/122.06; 303/195
[58] Field of Search ........................ 303/92, 100; 73/121

[56] References Cited

U.S. PATENT DOCUMENTS

| | | | |
|---|---|---|---|
| 3,803,425 | 4/1975 | Carp | 303/92 |
| 3,920,280 | 11/1975 | Luhdorff et al. | 303/92 |
| 4,192,180 | 3/1980 | Gerstenmeier et al. | 73/121 |
| 4,428,224 | 1/1984 | Farazi et al. | 73/2 |
| 4,499,543 | 2/1985 | Matsuda | 303/92 |
| 4,722,576 | 2/1988 | Matsuda | 303/92 |
| 4,841,446 | 6/1989 | Leiber et al. | 303/97 |
| 4,955,671 | 9/1990 | Higashimura | 303/92 |

FOREIGN PATENT DOCUMENTS

| | | |
|---|---|---|
| 0075932 | 4/1983 | European Pat. Off. . |
| 0369179 | 5/1990 | European Pat. Off. . |
| 2618755 | 11/1976 | Germany . |
| 3513937 | 10/1986 | Germany . |
| 3644139 | 7/1988 | Germany . |
| 3903071 | 8/1989 | Germany . |
| 3812904 | 9/1989 | Germany . |
| 3832541 | 3/1990 | Germany . |
| 3832518 | 4/1990 | Germany . |
| 3901776 | 7/1990 | Germany . |
| 3925829 | 2/1991 | Germany . |
| 89/10861 | 11/1989 | WIPO . |

*Primary Examiner*—Matthew C. Graham
*Attorney, Agent, or Firm*—Ratner & Prestia

[57] ABSTRACT

A circuit configuration for detecting wheel sensor malfunctions includes circuits which process and analyze the sensor signals ($s_1$ to $s_4$), which ascertain the speed ($v_{Rmax}$, $v_{Rmin}$), deceleration and acceleration ($a_R$) of the individual wheels and which compare these values with one another and compare them with predetermined threshold values ($a_0$, $v_0$, $v_1$, $-a_1$). Upon the detection of signals or combinations of signals typical of a sensor malfunction, the control will be disconnected after a predetermined period of time (T, T1+T2). When the measured acceleration values ($a_R$) are below an overspeed threshold ($a_0$) and the speed at any one of the remaining wheels is below a bottom speed threshold ($v_0$), the control will be disconnected as soon as the speed of a wheel ($v_{Rmax}$) exceeds a top speed threshold ($v_1$). A time monitoring function is started in the presence of a measured acceleration value ($a_R$) which is above the overspeed threshold ($a_0$) and in the presence of a measured speed value ($v_{Rmin}$) which is below the bottom speed threshold ($v_0$) as soon as a measured speed value ($v_{Rmax}$) exceeds a top speed threshold ($v_1$). Anti-lock and traction slip control will be disconnected upon lapse of the predetermined time period.

3 Claims, 3 Drawing Sheets

CIRCUIT CONFIGURATION FOR DETECTING WHEEL SENSOR MALFUNCTIONS

BACKGROUND OF THE INVENTION

The present invention relates to a circuit configuration, or system, for detecting wheel sensor malfunctions intended for automotive vehicle brake systems with electronic anti-lock control and/or traction slip control. Such a circuit configuration includes circuits which process and assess the sensor signals, which ascertain speed, deceleration and acceleration of the individual wheels and compare these values with one another as well as with predefined limit values. In addition, such a circuit configuration includes circuits which disconnect the control at least temporarily once signals or combinations of signals typical of a sensor malfunction are detected.

Monitoring the individual component parts and the operability of an electronically controlled brake system is of great significance. This is because once malfunctions are detected, the conventional functioning of the brakes can be safeguarded by disconnecting the control. Since a great variety of errors and types of errors can occur, the control systems are monitored by different measures in practice.

For instance, one monitoring method involves regularly generating test pulses and observing the reaction of the component parts to these pulses. Another monitoring method involves performing the signal processing in the electronic control unit of the system in parallel in separate circuits and monitoring the output signals generated this way for coincidence. A large number of errors can be detected by the so-called plausibility criteria method. This method of error detection is based on that specific measured values or combinations of signals are not physically possible when the system is intact. Thus, if such values or combinations of signals occur, an error is indicated. However, difficulties are involved in many cases to distinguish between signals caused by malfunctions and correct control signals.

Some types of errors or problems cannot be detected at all, or not reliably or not fast enough by all known monitoring methods. The monitoring of the wheel sensors is among these problems. Erroneous signals occur in a variety of circumstances, e.g. in the presence of too large of an air gap, when the toothed disc loosens or is mounted incorrectly, in the event of pulse generator teeth missing partly or wholly, etc. In these circumstances, it is difficult to determine whether the absence of sensor signals on starting the vehicle is due to a standstill of the wheel or due to the sensor wheel missing. Problems of this kind are known among specialists under the phrase "detection on starting".

An anti-lock system with a safety function is already known from European patent specification EP 0 075 932 B1, wherein specific pairs of signals are detected and an error is identified once a combination of signals occurs which is not possible during fail-safe operation. Specific sensor errors are unidentifiable this way because the signals caused by the malfunction can occur in certain control situations as well during a malfunction.

SUMMARY OF THE INVENTION

The circuit configuration of the present invention detects the sensor errors of different types occurring in practice very quickly and reliably and safeguards the conventional brake function in these cases by disconnecting the control.

The circuit configuration of the present invention disconnects or disables the control unit in the presence of a measured acceleration value at one, two or three wheels which is below a so-termed overspeed threshold and in the presence of a measured speed value at the remaining wheel or at least one of the remaining wheels which is below a bottom speed threshold, as soon as a measured wheel speed value exceeds a top speed threshold.

This circuit configuration serves to very quickly detect a sensor malfunction when the vehicle starts to drive and the acceleration is below the overspeed threshold.

Once a considerable deceleration occurs, i.e. when a wheel deceleration is below a predetermined deceleration limit value, a time monitoring function with a predetermined shortened duration will be started. The time monitoring function can be in the range between 20 and 60 seconds or roughly can amount to 30 seconds according to a preferred embodiment of a circuit configuration of the present invention.

To detect sensor malfunctions, for example when overspeeding occurs when the vehicle is starting to drive, a circuit configuration according to the present invention is devised such that under certain conditions, a time monitoring function will operate. These conditions include a measured acceleration value at up to three wheels which is above the overspeed threshold at any time from the starting of the vehicle, and a measured speed value on at least one of the remaining wheels which is below a bottom speed threshold, and a measured speed value which exceeds a top speed threshold. After the period of time predetermined by the time monitoring function has lapsed, the control unit is disconnected.

According to another preferred embodiment of the present invention, the time monitoring function accumulates the time periods in which a measured speed value exceeds the top speed threshold, while the time monitoring function is reset to the initial position once the measured speed value falls short of the bottom speed threshold. That is to say, the time element of the time monitoring function is stopped in those phases in which the measured speed value, after the top speed threshold is exceeded, drops below this top threshold again. Consequently, the elapsed time during these phases is not taken into account. The predetermined duration of the time monitoring function expediently ranges between 1 and 3 minutes, and preferably amounts to roughly 2 minutes.

According to an embodiment of the present invention, the time monitoring function is initiated in the presence of a measured acceleration value on at least one wheel which is above the overspeed threshold at any time from the starting of the vehicle and in the presence of a measured speed value which is below the bottom speed threshold, as soon as a measured speed value exceeds the top speed threshold. In another embodiment of the invention, when the above conditions are met and when the fastest wheel has a constant or approximately constant rotational behavior, the duration of the time monitoring function is shortened by a predetermined value in dependence on the acceleration of this wheel. Once a variation of the speed of the fastest wheel in the predetermined time unit is measured to be below 0.1 to 0.2 g roughly, the duration of the time monitoring function will be shortened by a value in the range between 10 and 50 seconds, e.g. by 20 seconds. Once an acceleration of this wheel occurs after the top speed threshold has been exceeded and this acceleration is in excess of a predetermined value (e.g. ±1 g), the commencement of the time span for detecting the constant wheel rotational behavior will be shifted to the point of time when this acceleration occurs.

Finally, according to a preferred embodiment of the present invention, after the top speed threshold has been exceeded, the control unit is switched over for the duration of the time monitoring function to a control pattern where the control is dependent on the deceleration and acceleration of the individual wheels, yet is not dependent on the measured slip values. Thus, in this phase, the control remains unaffected by an incorrect slip measurement which is due to a sensor malfunction, for instance.

BRIEF DESCRIPTION OF THE DRAWINGS

Further features, advantages and possibilities of application of the present invention can be taken from the following description by way of the drawings and an embodiment of the present invention.

In the drawings.

DETAILED DESCRIPTION OF THE DRAWINGS

Figure 1:
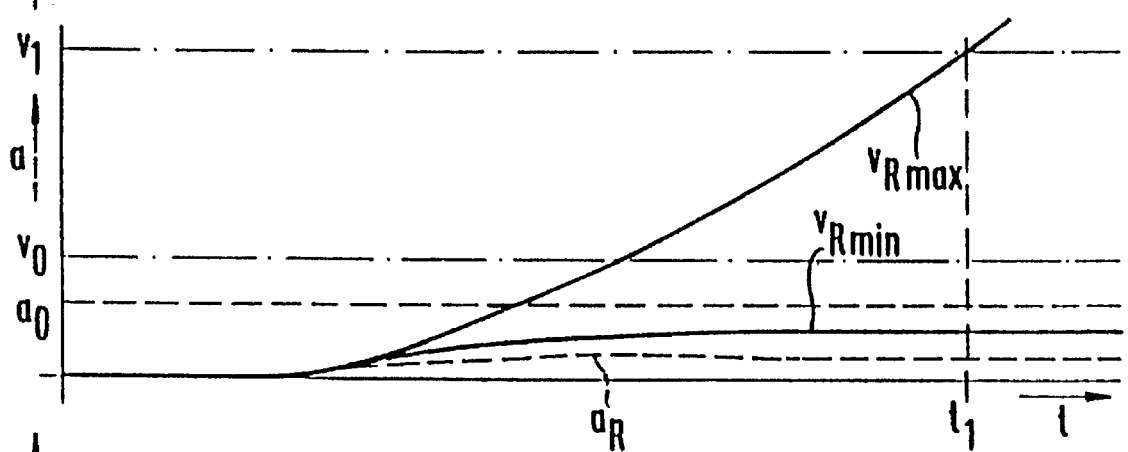
FIGS. 1, 2, 3, 4, 5 and 6 show the time variation of the wheel acceleration and the time variation of the fastest wheel and the slowest wheel in different situations.

The curve illustrated in FIG. 1 refers to a starting-to-drive operation "without overspeed". The speed variation of the fastest wheel $v_{Rmax}$, the speed of the slowest wheel $v_{Rmin}$, the acceleration of the fastest wheel $a_R$, as well as speed and acceleration thresholds are illustrated. The term "$a_0$" designates a so-called overspeed threshold, the term "$v_0$" designates a bottom speed threshold and the term "$v_1$" designates a top speed threshold. A bottom speed threshold of $v_0=5$ km/h and a top speed threshold of $v_1=20$ km/h are chosen in an embodiment of the present invention. A typical value for the overspeed threshold is $a_0=0.3$ g, with "g" referring to the constant of acceleration due to gravity.

In the starting operation to which FIG. 1 relates, a specific wheel acceleration of the fastest wheel $a_R$ is detected and remains below the acceleration threshold $a_0$. The speed characteristic curve $v_{Rmin}$ of a wheel does not reach the bottom speed threshold $v_0$. In this case, the occurrence of a sensor malfunction is detected at time $t_1$, when the speed of the fastest wheel $v_{Rmax}$ reaches the top speed threshold $v_1$. Upon detection of the malfunction, the anti-lock and traction slip control unit is disconnected or a control is prevented in any other way. This is because such a differing wheel rotational behavior is not possible in an intact system or a system with intact wheel sensors.

Figure 2:
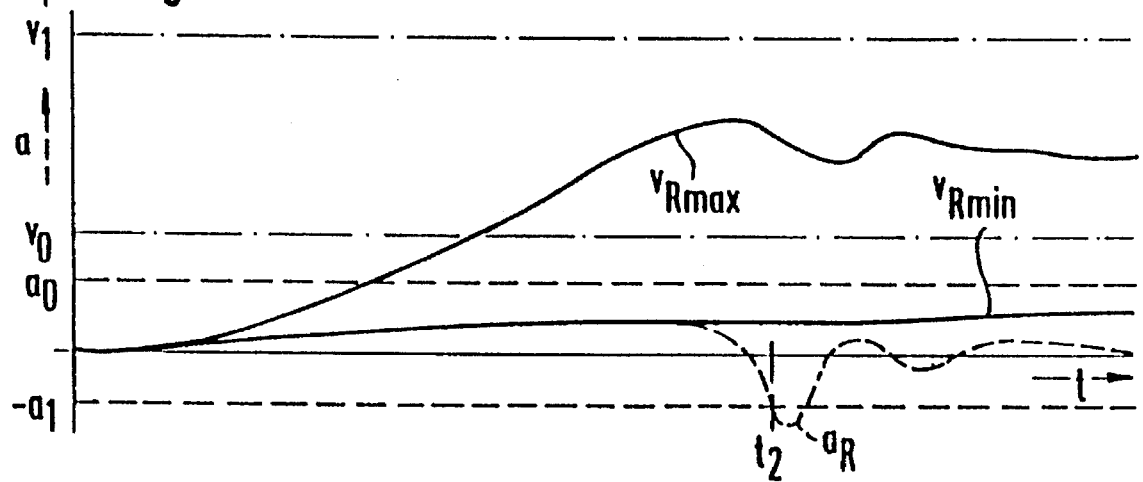

In addition to the thresholds $a_0$, $v_0$, $v_1$ described above, a bottom acceleration threshold "$-a_1$" is also depicted in FIG. 2. Upon starting of a vehicle, e.g. when upshifting the manually or automatically operated gearbox, it is typical for a "remarkable" wheel deceleration to occur, which involves a wheel deceleration falling short of the threshold $-a_1$ at the point of time $t_2$. This is interpreted as an "overspeeding in the standing position" and initiates a shortened time monitoring function. FIG. 2 shows the typical wheel variation $v_{Rmax}$, $v_{Rmin}$ and $a_R$ in a similar situation which could be caused by switching over, by driving over a patch of ice or the like.

Figure 3:
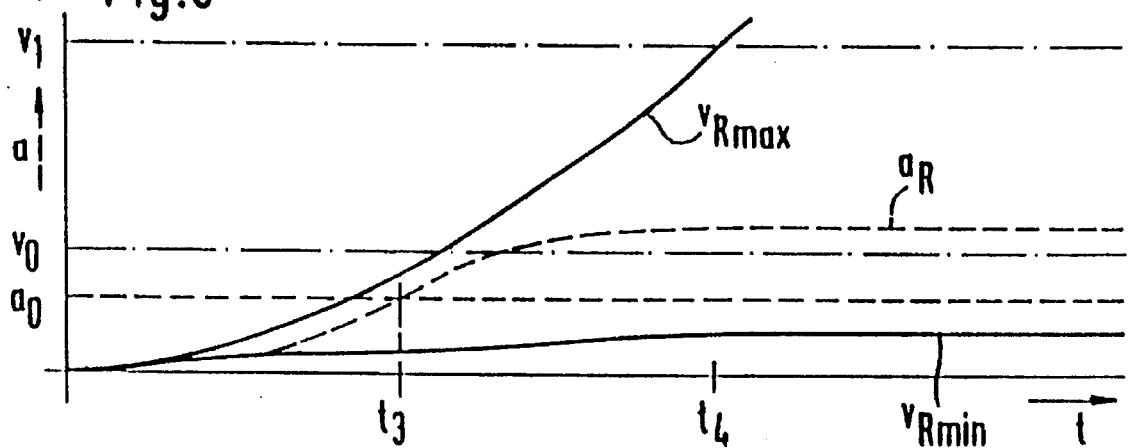

FIG. 3 refers to a starting operation "with overspeed". The acceleration $a_R$ exceeds the overspeed threshold $a_0$ at time $t_3$ at one, two or three wheels. Simultaneously, the speed $v_{Rmin}$ of at least one wheel remains below the bottom speed threshold $V_o$ which herein was defined to be 5 km/h. A similar signal variation could be due to 1. a starting action with up to three defective (i.e. not issuing a signal) wheel speed sensors, or
2. overspeed when standing on a road surface with a low coefficient of friction.

Therefore, a time monitoring function is initiated at time $t_4$ when the fastest wheel whose speed is referred to as $v_{Rmax}$ exceeds the top speed threshold $v_1$. The control will be disconnected upon the expiration of a predetermined period of time, which could amount to two minutes. This predetermined period of time can be shortened in dependence on specific criteria capable of identifying the existence of a wheel sensor malfunction.

Figure 4:
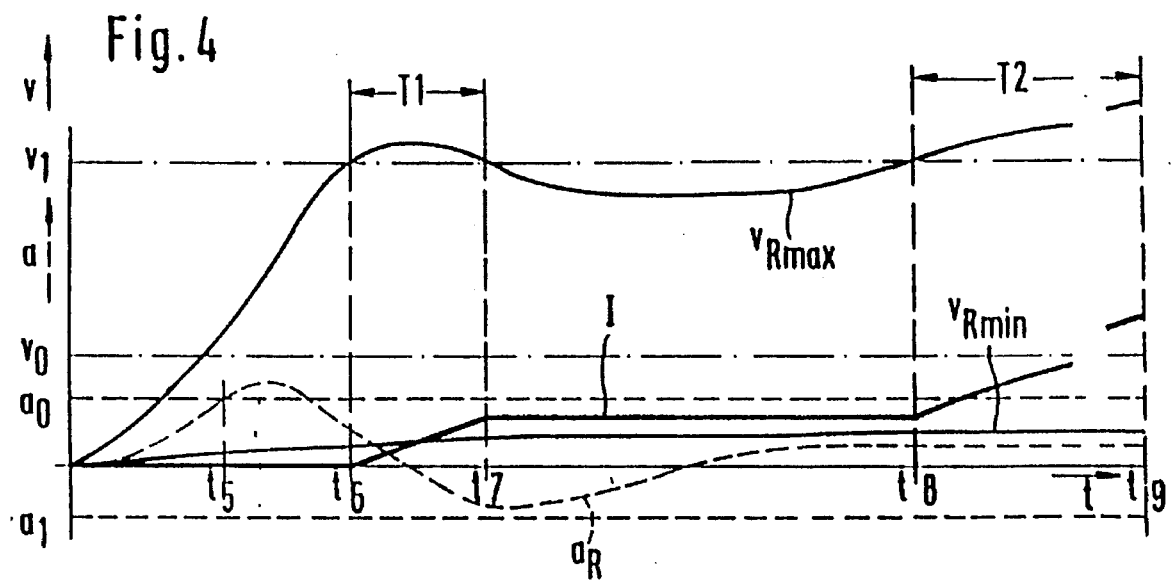

In the starting situation according to FIG. 4, the time scale was changed in comparison to FIGS. 1 to 3 to explain the time monitoring function. As in the example of FIG. 3, the wheel acceleration $a_R$ exceeds the overspeed threshold $a_o$ at the point of time $t_5$, and the speed $v_{Rmax}$ of the fastest wheel exceeds the top speed threshold $v_1$ at the point of time $t_6$. Consequently, the time monitoring function is started to operate at the point of time $t_6$. The contents I of a corresponding accumulator or time counter begin to accumulate at time $t_6$, as illustrated in FIG. 4. The counter will be stopped and the counter contents will remain constant if, like in the example according to FIG. 4, the measured speed value $v_{Rmax}$ at time $t_7$ temporarily drops below the top speed threshold $v_1$ and exceeds this threshold again at the point of time $t_8$. This "time interruption" between $t_7$ and $t_8$ consequently prolongs the duration until disconnection of the control unit after the first error detection at time $t_6$.

At time $t_9$, the predetermined duration T ends. The predetermined duration could range between one minute and two minutes. In the example shown in FIG. 4, the control unit is disconnected after the predetermined duration plus the time difference between $t_7$ and $t_8$ from time $t_6$ expires. The duration T is composed of the time spans T1+T2 in this case.

Figure 5:
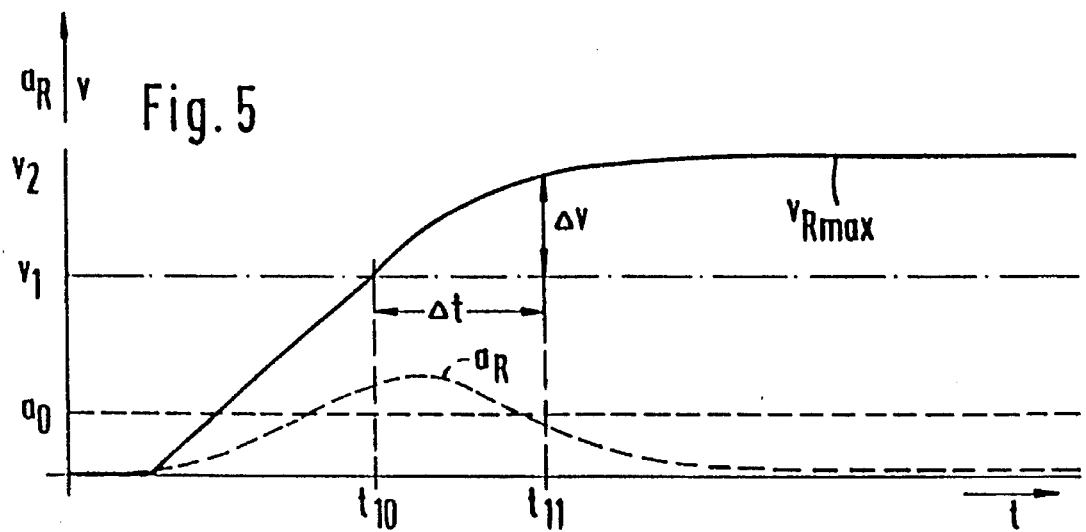
Figure 6:
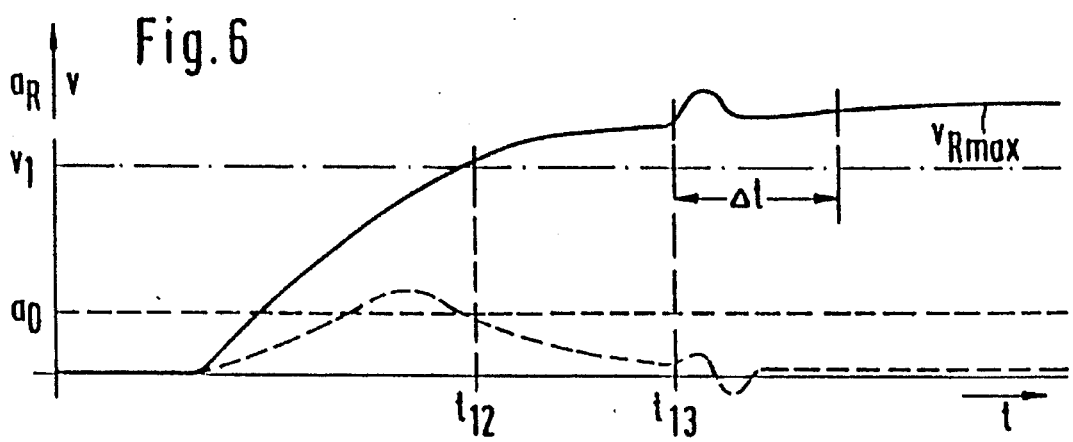

The diagrams according to FIGS. 5 and 6 also relate to situations in which the speed variation $v_{Rmax}$ of the fastest wheel indicates overspeeding of this wheel. In both cases, the acceleration $a_R$ exceeds the acceleration threshold $a_0$ at some time from the starting of the vehicle. The monitoring time T is initially set to a value between one and two minutes. In order to be able in such a case to considerably reduce the monitoring time T commencing at the time when the top speed threshold $v_1$ is exceeded, the variation of the speed $\Delta v/\Delta t$ is measured with a relatively coarse screen pattern, after the speed threshold $v_1$ is exceeded.

For the time span Dr, a magnitude of 1 to 3 seconds, roughly 2 seconds, is chosen. Once a variation $\Delta v/\Delta t$ is measured which is below a predetermined value (e.g. 0.1 to 0.2 g), this implies an approximately constant rotational behavior of this wheel. In this case to which FIG. 5 is relating, the monitoring time T is shortened by a specific amount in the range between 10 and 50 seconds, for instance by roughly 20 seconds. This minor speed variation or deceleration of less than 0.1 or 0.2 g within the monitoring interval At is interpreted as detection of a "stationary or quasi stationary driving action".

In addition to this measurement of the speed variation in the coarse time-slot pattern or within the monitoring time interval Dt, the acceleration dv/dt is still measured. To this end, the speed variation within a working clock which can range between 5 and 10 milliseconds for instance is determined. Once an abrupt change in acceleration occurs during this stationary or quasi stationary driving operation, which is shown at time $t_{13}$ in the example according to FIG. 6, the commencement of the monitoring interval $\Delta t$ is shifted from the point of time $t_{12}$ in FIG. 6, at which the speed threshold $v_1$ was exceeded, to the point of time $t_{13}$. Such short-time major accelerations can be due for instance to road trouble, to a road surface covered by slick ice or to similar circumstances.

Figure 7:
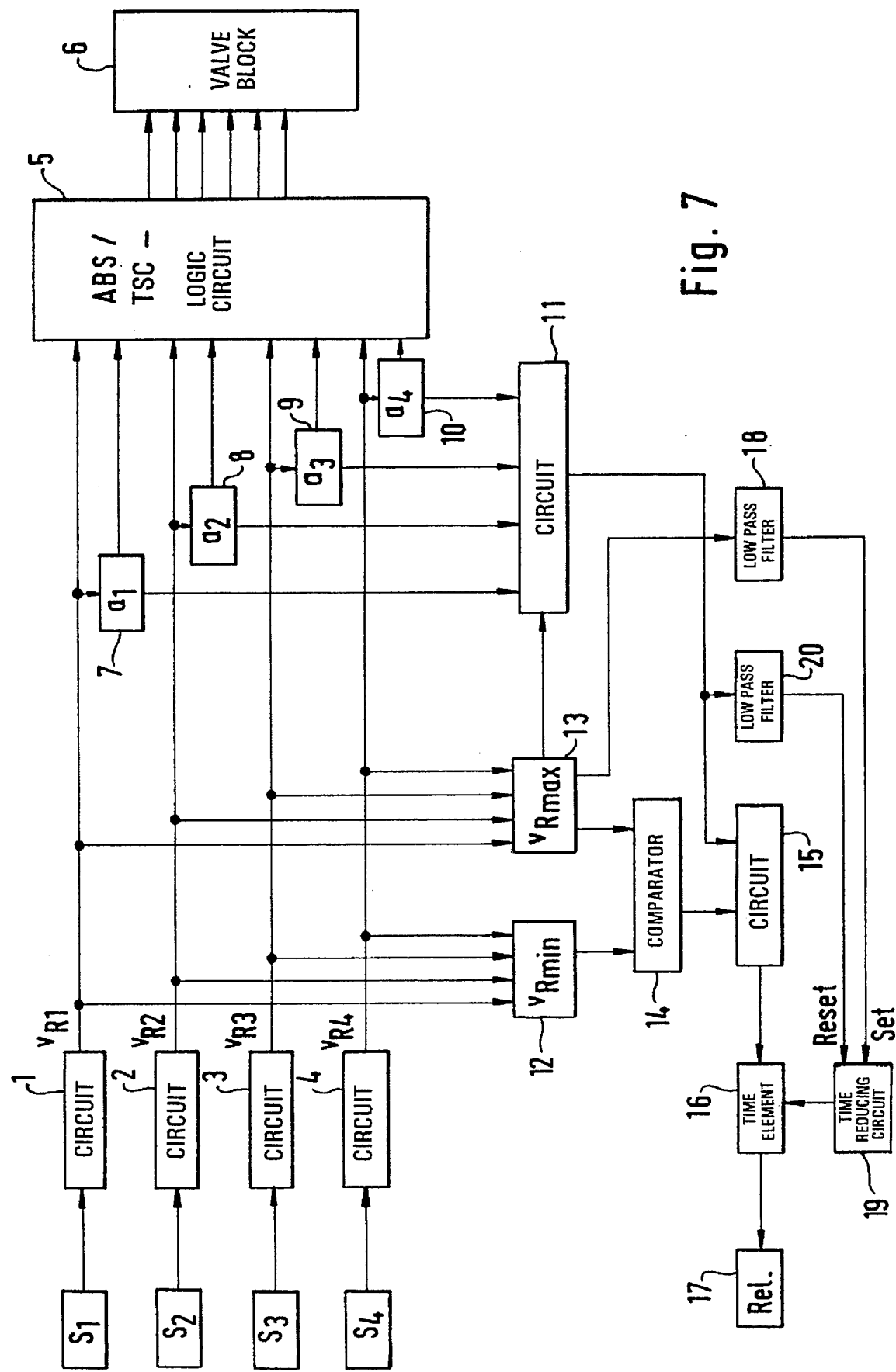
FIG. 7 shows a block diagram of the most important component parts of a circuit configuration according to the present invention.

FIG. 7 illustrates the connection of the most important component parts of a circuit configuration according to this invention. First, signals $v_{R1}$ to $v_{R4}$ representative of the wheel speeds are generated from the output signals representative of wheel rotational behavior of wheel sensors $S_1$ to $S_4$ in evaluating circuits 1 to 4. Thereafter, valve control signals are produced from these signals in a known fashion by way of an ABS/TSC logic circuit 5 and are applied to a valve block 6 for the purpose of braking pressure modulation. Circuits 7 to 10 which serve to obtain the acceleration signals $a_1$ to $a_4$ by way of the differentiation of the speed signals are also shown in FIG. 5.

These acceleration signals are required by the ABS/TSC control logic circuit 5 and also assist in detecting sensor malfunctions. Therefore, the acceleration signals $a_1$ to $a_4$ are supplied also to a time monitoring arrangement circuit 11 which presets the predetermined times in response to the respective situation until the control unit is disconnected in the case of malfunction.

Further, the inventive circuit configuration according to FIG. 7 comprises circuits 12, 13 for determining the instantaneously lowest (12) and highest (13) wheel speeds, respectively $v_{min}$ and $v_{max}$. In a comparator 14, the highest speed $v_{Rmax}$ is compared with the lowest speed $v_{Rmin}$, and subsequently the duration T is predetermined in dependence on the output signal of the time monitoring circuit 11 in a circuit 15. The duration T will last from the time when the top speed threshold $v_1$ is exceeded until the disconnection of the control. The output signal of the circuit 15 is therefore supplied via a time element 16 to a main relay 17 which finally disconnects the control when a sensor malfunction is detected.

The output signal of the circuit 13 which selects the instantaneously highest wheel speed $v_{Rmax}$ is further supplied to a low-pass filter 18 having a predetermined time constant in the seconds range. Once the speed signal $v_{Rmax}$, namely the output signal of the circuit 13, passes over into a stationary or quasi stationary range, a time-reducing circuit 19 is set by means of the low-pass filter 18 and, in turn, drives the time element 16 and presets the predetermined duration in this situation until the disconnection of the control. The "reset" of the time-reducing circuit 19 is controlled by means of a second low-pass filter 20 which evaluates the output signal of the time-monitoring circuit 11. The time constant of the low-pass filter 20 is in the milliseconds range, e.g. between 5 and 10 milliseconds.

The output signal of the time monitoring circuit 11 which evaluates the wheel acceleration is compared in the circuit 15 with the output signal of the comparator 14 and hence is made use of also for driving the time element 16.

We claim:

1. A system for detecting wheel sensor malfunctions for an automotive vehicle having a plurality of wheels each having a rotational behavior and having a brake system with a control unit including at least one of anti-lock control and traction slip control, said system for detecting wheel sensor malfunctions comprising:

sensor means for sensing the rotational behavior of said plurality of wheels and generating output signals representative of the rotational behavior;

first circuit means, responsive to said output signals, for generating:
(a) wheel speed signals individually representative of the wheel speeds of said plurality of wheels and
(b) wheel acceleration signals individually representative of the wheel accelerations of said plurality of wheels;

logic circuit means, responsive to:
(a) said wheel speed signals and
(b) said wheel acceleration signals,
for generating valve control signals;

a valve block responsive to said valve control signals for modulating braking pressure; and second circuit means, responsive to:
(a) said wheel speed signals,
(b) said wheel acceleration signals,
(c) a predetermined overspeed threshold,
(d) a predetermined top speed threshold, and
(e) a predetermined bottom speed threshold for:
(a) detecting a sensor malfunction when:
(i) at least one of said wheel speed signals has a value which is below said bottom speed threshold,
(ii) at least one of said wheel speed signals has a value which exceeds said top speed threshold, and
(iii) at least one of said wheel acceleration signals has a wheel acceleration value which is below said overspeed threshold, and
(b) disconnecting the control unit when a sensor malfunction is detected.

2. A system in accordance with claim 1 further comprising:

means for developing slip values;

means for switching the control unit to respond to the deceleration and acceleration of the individual wheels, irrespective of said slip values, when at least one of said wheel speed signals has a value which exceeds said top speed threshold.

3. A system in accordance with claim 1, wherein said second circuit means:

respond further to an overspeed threshold; and further include means for:
(a) comparing said wheel speed signals with said top speed threshold, and
(b) comparing said wheel acceleration signals with said overspeed threshold.

* * * * *